US006478418B2

United States Patent
Reboa et al.

(10) Patent No.: US 6,478,418 B2
(45) Date of Patent: Nov. 12, 2002

(54) INKJET INK HAVING IMPROVED DIRECTIONALITY BY CONTROLLING SURFACE TENSION AND WETTING PROPERTIES

(75) Inventors: Paul F. Reboa; John R Moffatt; William R Knight, all of Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/798,704

(22) Filed: Mar. 2, 2001

(65) Prior Publication Data

US 2002/0145653 A1 Oct. 10, 2002

(51) Int. Cl.[7] .................................................. B41J 2/01
(52) U.S. Cl. ...................................... 347/100; 347/101
(58) Field of Search ................................ 347/101, 100, 347/98, 96; 399/97; 106/31–58, 31.46, 31.47

(56) References Cited

U.S. PATENT DOCUMENTS

| 4,336,544 A | 6/1982 | Donald et al. ................ 346/1.1 |
| 4,500,895 A | 2/1985 | Buck et al. ............... 346/140 R |
| 4,555,062 A | 11/1985 | You ............................ 239/690 |
| 4,583,690 A | 4/1986 | You ............................ 239/690 |
| 4,771,295 A | 9/1988 | Baker et al. ................. 346/1.1 |
| 4,791,438 A | 12/1988 | Hanson et al. .......... 346/140 R |
| 4,794,411 A | 12/1988 | Taub et al. .............. 346/140 R |
| 4,853,037 A | 8/1989 | Johnson et al. ................ 106/22 |
| 4,931,811 A | 6/1990 | Cowgar et al. .......... 346/140 R |
| 4,944,850 A | 7/1990 | Dion ............................. 204/15 |
| 5,098,476 A | 3/1992 | Baker ............................ 106/22 |
| 5,109,239 A | 4/1992 | Cobbs et al. ............ 346/140 R |
| 5,112,399 A | 5/1992 | Slevin et al. .................. 106/22 |
| 5,113,199 A | 5/1992 | Chan et al. .................... 346/1.1 |
| 5,121,132 A | 6/1992 | Pan et al. ...................... 346/1.1 |
| 5,278,584 A | 1/1994 | Keefe et al. ............. 346/140 R |
| 5,371,527 A | 12/1994 | Miller et al. ................... 347/46 |
| 5,434,606 A | 7/1995 | Hindagolla et al. ........... 347/45 |
| 5,467,115 A | 11/1995 | Childers ....................... 347/47 |
| 5,469,199 A | 11/1995 | Allen et al. ................... 347/42 |
| 5,598,193 A | 1/1997 | Halko et al. ................... 347/45 |
| 5,626,655 A * | 5/1997 | Pawlowski et al. ......... 347/100 |
| 5,679,143 A | 10/1997 | Looman ................... 106/20 R |
| 5,685,074 A | 11/1997 | Pan et al. ................... 29/890.1 |
| 5,772,742 A | 6/1998 | Wang ....................... 106/31.27 |
| 5,880,758 A | 3/1999 | Stoffel et al. ................. 347/43 |
| 5,972,082 A | 10/1999 | Koyano et al |
| 6,051,057 A * | 4/2000 | Yatake et al. ............. 106/31.58 |
| 6,099,074 A | 8/2000 | Wallace .................... 297/158.4 |
| 6,271,285 B1 * | 8/2001 | Miyabayashi et al. ...... 523/160 |

FOREIGN PATENT DOCUMENTS

| EP | EP0477555 A1 | 4/1992 |
| EP | EP0583096 A1 | 2/1994 |

OTHER PUBLICATIONS

Hewlett–Packard Journal, vol. 39, No. 4 (Aug. 1988).

* cited by examiner

Primary Examiner—John Barlow
Assistant Examiner—Manish S. Shah

(57) ABSTRACT

An inkjet ink for printing onto a print medium is provided. The inkjet ink evidences minimal tail breakup and improved drop trajectory, thereby evidencing improved print quality. The minimal tail breakup and improved drop trajectory are achieved by adding at least one surface active additive to the ink to provide the ink with a surface tension of at least 35 dyne/cm and a contact angle (with an orifice plate comprising KAPTON, an aromatic polyimide) of about 35 to 65 degrees.

21 Claims, 2 Drawing Sheets

INKJET INK HAVING IMPROVED DIRECTIONALITY BY CONTROLLING SURFACE TENSION AND WETTING PROPERTIES

TECHNICAL FIELD

The present invention is directed to inkjet inks, and, more particularly, to inkjet inks that evidence improved directionality during jetting through nozzles of an inkjet cartridge.

BACKGROUND ART

Thermal inkjet print cartridges operate by rapidly heating a small volume of ink to cause the ink to vaporize and be ejected through one of a plurality of orifices so as to print a dot of ink on a recording medium, such as a sheet of paper. Typically, the orifices are arranged in one or more linear arrays in a nozzle member. The properly sequenced ejection of ink from each orifice causes characters or other images to be printed upon the paper as the printhead is moved relative to the paper. The paper is typically shifted each time the printhead has moved across the paper. The thermal inkjet printer is fast and quiet, as only the ink strikes the paper. These printers produce high quality printing and can be made both compact and affordable.

In one prior art design, the inkjet printhead generally includes: (1) ink channels to supply ink from an ink reservoir to each vaporization chamber proximate to an orifice; (2) a metal orifice plate or nozzle member in which the orifices are formed in the required pattern; and (3) a silicon substrate containing a series of thin film resistors, one resistor per vaporization chamber.

To print a single dot of ink, an electrical current from an external power supply is passed through a selected thin film resistor. The resistor is then heated, in turn superheating a thin layer of the adjacent ink within a vaporization chamber, causing explosive vaporization, and, consequently, causing a droplet of ink to be ejected through an associated orifice onto the paper.

A recurring problem over the years involves drop trajectory as the drop is ejected through the orifice onto a print medium, e.g., paper. For example, whenever an ink drop is ejected from an orifice of an orifice plate, a trailing portion or "tail" of ink moves with the drop. A small amount of the ink tail may separate and land on the outer surface of the plate as an ink droplet. Residual ink that collects on the orifice plate outer surface near the edges of the orifices may contact subsequently ejected ink drops, thereby altering the trajectory of those drops, which reduces the quality of the printed image.

Also, in the event that a substantial amount of residual ink accumulates on the orifice plate outer surface, a continuous liquid path between the ink within the orifice and the ink on the outer surface may be formed, thereby facilitating leakage of the ink out of the orifice. Further, when a substantial amount of ink accumulates on an orifice plate, this large pool of ink can interfere with drop ejection to the extent that no drops are ejected, i.e., a single drop is unable to pass through the large pool of ink. Moreover, the residual ink on the outer surface of the plate tends to trap minute particles, such as paper fibers, thereby interfering with the trajectory of subsequently-ejected drops.

For many years, ink jet technologies which have been developed to produce printheads for ink jet printers and the like have included sub-categories or sub-technologies directed specifically to forming the output ink ejection orifice plate or nozzle plate for controlling the ink drop patterns and ink trajectories onto an adjacent print medium. As is well-known to those skilled in the art, these orifice plate technologies include those for making silicon orifice plates, glass orifice plates, plastic orifice plates, and metal orifice plates of many different kinds of materials in each of the latter four types of orifice plate categories. In addition, these metal (e.g., nickel) orifice plate technologies include electroforming and electroplating processes including the fabrication of mandrels for making small geometry precision architecture orifice plates for attachment to thin film printhead substrates.

A variety of solutions have been patented that deal with drop trajectory. Many of these solutions comprise various alterations of the mechanical aspect of the printer, and examples of such solutions include: (1) off-setting the orifice from the resistor (see, e.g., U.S. Pat. No. 4,794,411, entitled "Thermal Ink-Jet Head Structure with Orifice Offset from Resistor", issued Dec. 27, 1988, to Howard H. Taub et al); (2) providing a drop detector for measuring flight characteristics of the drop and correcting the drop fire timing and image data to produce a higher quality image (see, e.g., U.S. Pat. No. 5,109,239, entitled "Inter Pen Offset Determination and Compensation in Multi-Pen Ink Jet Printing Systems", issued Apr. 28, 1992, to Keith E. Cobbs et al); (3) eliminating the orifice plate (see, e.g., U.S. Pat. No. 5,371,527, entitled "Orificeless Printhead for an Ink Jet Printer", issued Dec. 6, 1994, to Robert J. Miller et al); (4) reconfiguring the fabrication of a printhead to prevent bending of a nozzle member, which skews the nozzles, by forming the nozzles at a slight inward angle (see, e.g., U.S. Pat. No. 5,467,115, entitled "Inkjet Printhead Formed to Eliminate Ink Trajectory Errors", issued Nov. 14, 1995, to Winthrop D. Childers); and (5) altering the architecture of the pen itself, that is, the structural portions, including passageways and peninsulas, that guide the ink to the firing chambers (U.S. Pat. No. 5,685,074, entitled "Method of Forming an Inkjet Printhead with Trench and Backward Peninsulas", issued Nov. 11, 1997, to Yichuan Pan et al).

Other solutions include: (1) providing selected portions of the orifice plate with wetting and non-wetting surface characteristics (see, e.g., U.S. Pat. No. 5,434,606, entitled "Orifice Plate for an Ink-Jet Pen", issued Jul. 18, 1995, to Suraj L. Hindagolla et al); and (2) treatment of the inner and outer surfaces of the orifice plate with self-assembled monolayers (see, e.g., U.S. Pat. No. 5,598,193, entitled "Treatment of an Orifice Plate with Self-Assembled Monolayers", issued Jan. 28, 1997, to David J. Halko et al).

The ink itself has been reformulated in an attempt to overcome drop trajectory problems; see, e.g., (1) U.S. Pat. No. 5,098,476, entitled "Additive to Aqueous-Based Inks to Improve Print Quality", issued Mar. 24, 1992, to Jeffrey P. Baker and (2) U.S. Pat. No. 5,112,399, entitled "Plain Paper Inks", issued May 12, 1992, to Leonard Slevin et al.

In U.S. Pat. No. 5,098,476, a low molecular weight alcohol or a surfactant/defoming agent is added to reduce the surface tension of the ink and increase the surface wettability on paper. In U.S. Pat. No. 5,112,399, a viscosity modifier, such as an alginate, is used to increase the viscosity of the ink and thereby reduce spray and improve drop directionality.

Other modifications of inkjet inks involving surface tension control have also been undertaken, for a variety of reasons. For example, U.S. Pat. No. 5,880,758, entitled "Printer with Pen Containing a Low Dot Spread Black Ink and a High Dot Spread Color Ink", issued Mar. 9, 1999, to John L. Stoffel et al, discloses use of a surface tension in the range of 25 to 40 dyne/cm and a viscosity in the range of 1.5 to 10 cp for a relatively high dot spread ink (color ink) and a surface tension in the range of 45 to 65 dyne/cm and a viscosity in the same range as the color ink for a relatively low dot spread ink (black ink).

The combination of adjusting the surface tension of the ink and the contact angle of the ink and a solid surface, such as the print medium or a surface within the pen has also been considered; see, e.g., U.S. Pat. No. 5,626,655, entitled "Use of Co-Surfactants to Adjust Properties of Inks", issued May 6, 1997, to Norman E. Pawlowski et al.

See also U.S. Pat. Nos. 4,555,062 and 4,583,690, both entitled "Anti-Wetting in Fluid Nozzles", issued Nov. 26, 1985 and Apr. 22, 1986, respectively, to Young S. You, which disclose a novel ionic surface preparation for nozzles used in spraying fluid droplets such as used in inkjet printers In most cases, it appears that the prior art is primarily directed to adjusting the surface tension of the ink in order to deal with print quality issues, such as feathering of the print on the print medium, blooming, and the like.

Recent advances in inkjet printheads have moved in the direction of printing smaller and smaller drop volumes, with a reduction in diameter of the orifices in the printhead. As a consequence, the proper trajectory of the ejected ink droplet becomes more and more critical, and the ink must be carefully conditioned by its formulation to achieve the required trajectory. While the above-discussed patents are certainly suitable for their intended purposes, they do not deal with the issue of reduced drop volumes and their effects on droplet trajectories.

Thus, there remains a need for improved directionality of the ink as it leaves the printhead. Specifically, a need exists for an ink having reduced tail breakup and improved drop trajectory, with a concomitant improvement in print quality.

DISCLOSURE OF INVENTION

In accordance with the present invention, an inkjet ink for printing onto a print medium is provided. The inkjet ink evidences minimal tail breakup and improved drop trajectory, thereby evidencing improved print quality. The minimal tail breakup and improved drop trajectory are achieved by formulating the ink to include at least one surface active additive in an amount sufficient to provide the inkjet ink with a surface tension of at least 35 dyne/cm and a contact angle with the orifice plate in the range of 35 to 65 degrees.

Further in accordance with the invention, a method is provided for reducing tail breakup and improving drop trajectory in an inkjet ink, wherein at least one surface active additive is added to the ink.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

All concentrations herein are expressed in weight percentages, unless otherwise indicated. The purity of all components is that employed in normal commercial practice for ink-jet inks.

Although the description that follows is primarily directed to thermal inkjet printing, it will be apparent to those skilled in this art that other methods of inkjet printing, such as piezoelectric, will also be benefited by the teachings of the present invention.

Several physical properties of inks play dominant roles in the firing and directionality of ink from thermal inkjet pens. The properties of most interest are surface tension, or air-liquid interaction between air and ink, and wetting properties as exhibited by contact angle, or air-solid-liquid interaction, measurements. In the latter case, the solid is the orifice plate 104 that is made of KAPTON (or other aromatic polyimide) and the liquid is again the ink.

Figure 1A:
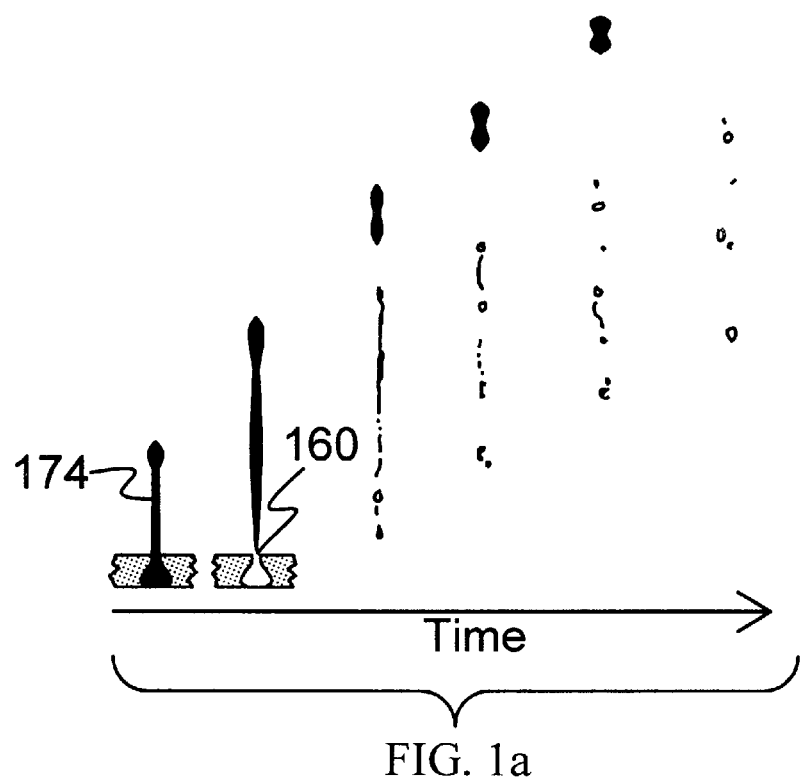
FIG. 1a is a series of sequential views of an inkjet ink that is jetted from chamber, wherein the ink has a surface tension of 100 dyne/cm.
Figure 1B:
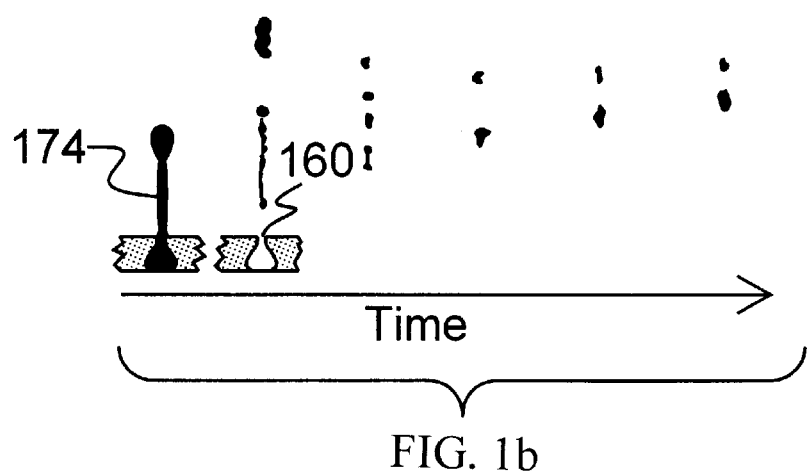
FIG. 1b is a view similar to that of FIG. 1a, but wherein the ink has a tension of 25 dyne/cm.

As part of an on-going study, the present inventors have investigated the effect of surface tension of the ink on both directionality and in tail breakup of the fired ink drop. Studies using both modeling and actual ink showed that the higher the surface tension, the less the tail breakup. Tail breakup is a significant contributor to print quality (PQ) degradation by generating satellite drops that do not land with the main drop, causing unevenness of text character outline, for example. So a beneficial characteristic of inks is to have as high a surface tension as possible for better edge acuity. Hewlett-Packard's black inks have much higher surface tension than its color inks for this reason; see, e.g., U.S. Pat. No. 5,880,758, supra. The modeling results are in FIGS. 1a–1b, comparing the breakup of an ink having a surface tension of 25 dynes/cm (low surface tension ink— FIG. 1b) versus an ink having a surface tension of 100 dynes/cm (admittedly an ultra-high surface tension ink— FIG. 1a).

The present inventors have found that minimal tail breakup and improved drop trajectory of an inkjet ink is achieved by adding at least one surface active additive to the ink in an amount sufficient to provide the ink with a surface tension of at least 35 dyne/cm and a contact angle (with the orifice plate 104 comprising KAPTON) within a range of about 35 to 65 degrees. The surface active additive may be a surfactant, such as an amine oxide, a betaine, a sulfobetaine, or a polymeric surfactant. Alternatively, or together with, the surface active additive may be an oligomer. These two types of surface active additives are now described in greater detail.

1. Surfactants

In addition to the surface tension aspect described above, it is also important for the inks to interact as much as possible with the walls 156 of the firing chamber 160 and barrel 200 of the nozzles, or orifices, 124 of the orifice plate 104 of the ink cartridge 10 because this also leads to better directionality. For example, FIG. 2 demonstrates the effect of different amine oxide (AO) surfactants and blends of these surfactants on directionality. The run numbers used in FIG. 2 and their relationship to ink composition are given in Table I below.

TABLE I

Ink Formulations.

| Run No. | C8AO (wt %) | C12AO (wt %) | C16AO (wt %) | Density (g/cm$^3$, 23° C.) | Viscosity (cps, 23° C.) |
|---|---|---|---|---|---|
| Water | — | — | — | 0.9975 | 0.95 |
| 1 | 0.01 | — | — | 1.0931 | 3.15 |
| 2 | 0.1 | — | — | 1.0917 | 3.14 |
| 3 | 1.0 | — | — | 1.0905 | 3.30 |
| 4 | — | 0.05 | — | 1.0916 | 3.12 |
| 5 | — | 0.1 | — | 1.0923 | 3.13 |
| 6 | — | 1.0 | — | 1.0898 | 3.32 |
| 7 | — | — | 0.005 | 1.0917 | 3.09 |
| 8 | — | — | 0.01 | 1.0915 | 3.10 |
| 9 | — | — | 0.1 | 1.0914 | 3.11 |
| 10 | — | — | 1.0 | 1.0910 | 3.22 |
| 11 | 0.1 | 0.1 | — | 1.0924 | 3.14 |
| 12 | 0.1 | — | 0.1 | 1.0921 | 3.13 |
| 13 | — | 0.1 | 0.1 | 1.0919 | 3.12 |
| 14 | 1.0 | — | 1.0 | 1.0890 | 3.54 |
| 15 | 1.0 | — | 1.0 | 1.0904 | 3.34 |
| 16 | — | 1.0 | 1.0 | 1.0904 | 3.39 |
| Control* | — | — | — | 1.0616 | 3.77 |

Note: *Control = cyan ink disclosed in U.S. Pat. No. 5,772,742.

The amine oxide surfactants specifically studied included octyl di-methyl amine oxide (C8AO), dodecyl dimethyl amine oxide (C12AO), hexacecyl di-methyl amine oxide (C16AO), blends of (1) C8/C12, (2) C8/C16, and (3) C12/C16, and Control. The control ink, which was also the same basic composition to which the amine oxides were added, is disclosed in U.S. Pat. 5,772,742, entitled "Dye Set for ed Color Quality for Ink-Jet Printers", issued on Jun. 30, 1998, to Patricia A. All formulation also contained 0.1 wt % Proxel GXL preservative.

Figure 2:
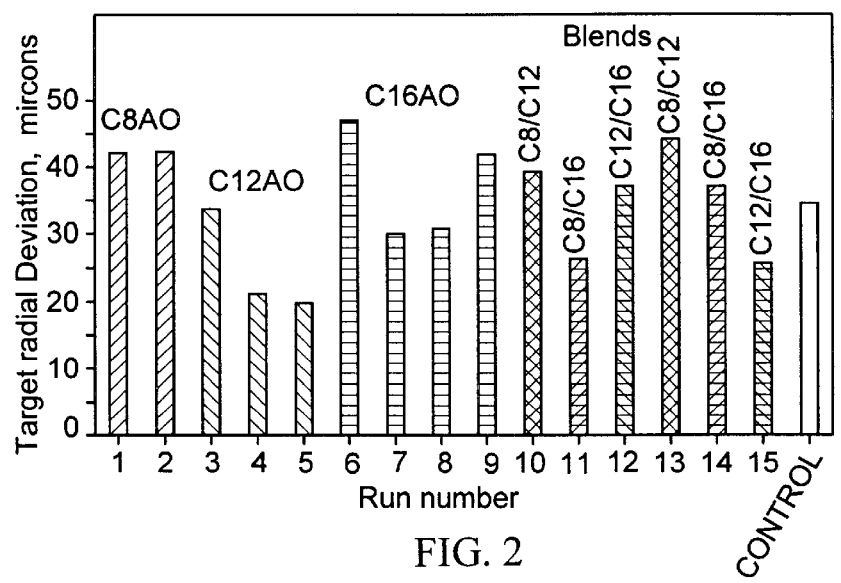
FIG. 2, on coordinates of target radial deviation (in microns) and amine oxide surfactants, is a bar plot of the effect of different amine oxide surtactants on directionality.

A lower target radial deviation is desired, and it can be seen from FIG. 2 that C12AO provided the best values.

The amine oxides employed in the practice of the present invention are given by the formula

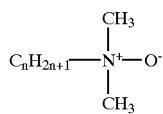

where n=8 to 16.

The C8AO (octyl dimethyl amine oxide; n=8) surfactant is too hydrophilic and prefers to interact with water than with the interior surfaces of materials such as the barrier layer 156 of the firing chamber 160 and nozzle walls 200. The C16AO (hexadecyl dimethyl amine oxide; n=16) is too hydrophobic and interacts mostly with itself in forming micelles and other insoluble structures so that it too is not instrumental in affecting directionality. The C12AO (dodecyl dimethyl amine oxide; n=12) is by far the best at achieving best drop directionality because it has the best blend of wetting and attraction to the interior firing surfaces. Both the surface tension and contact angle between both ink and KAPTON (orifice plate) and ink and polymethylacrylate (barrier layer) have been measured for the amine oxide surfactants; it was determined that the C12AO has the lowest values in both categories of these surfactants.

Figure 3:
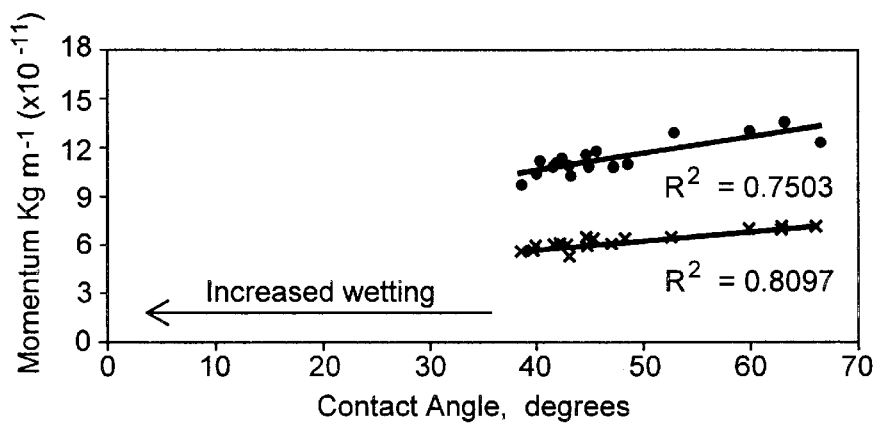
FIG. 3, on coordinates of momentum (in Kg/m) and contact angle (in degrees), is a plot of showing the correlation of contact angle (surface wetting on an orifice plate comprising KAPTON, an aromatic polyimide) as a function of main drop velocity.

Furthermore, there is a strong correlation between drop momentum and KAPTON contact angle (better correlation than the surface tension), as shown in FIG. 3, wherein C12AO was used as the surfactant.

Figure 4:
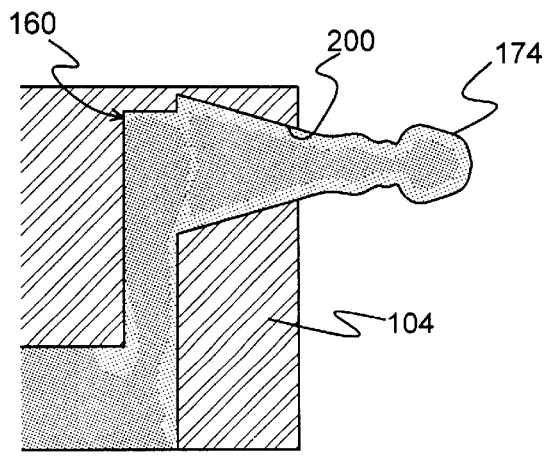
FIG. 4 is a side elevational view of a droplet of ink in the process of being expelled from a firing chamber.

The effect of the KAPTON contact angle can be understood from a modeling study which showed that the highest shear rates and velocity vectors during the firing cycle are to be found along the walls of the barrier layer. The shear profiles are seen in FIG. 4 for a pen employed in Hewlett-Packard's DesignJet 2500 printer, with the lighter the shading, the higher the shear and velocity profile. It stands to reason that, if the nozzle is aiming correctly, the more the ink interacts with the walls (i.e., KAPTON material) of the nozzle in the orifice plate, then the better because it will be directed to its target more accurately. This effect is clearly seen in FIG. 3 with C12AO where the concentration of the C12AO is increased in going from left to right, and contact angle correspondingly decreases.

The amine oxides suitably employed in the practice of the invention include those compounds with n greater than 8 and less than 16. Preferably, n=12.

Related compounds are also useful in the practice of the present invention. Such related compounds include:

betaines:

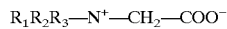

sulfo-betaines:

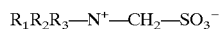

where
$R_1$ is a $C_8$ to $C_{22}$ alkyl chain, and
$R_2$ and $R_3$ are independently $C_1$ to $C_4$ alkyl chains; and polymeric surfactants:

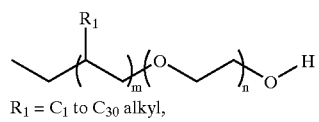

$R_1 = C_1$ to $C_{30}$ alkyl,

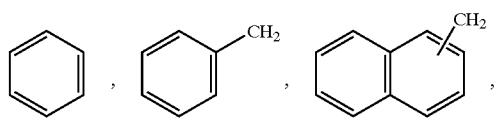

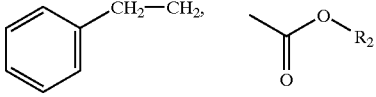

$R_2 = C_1$ to $C_{10}$ alkyl,

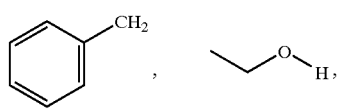

The surfactant (amine oxide, betaine, sulfo-betaine, polymeric surfactant) has a concentration in the ink that is at or below its critical micelle concentration (cmc). For example, the cmc for C12AO is 0.5 wt %, so the concentration of C12AO in the ink must be at or below 0.5 wt %. (The cmc is the concentration of colloidal species where simple electrolyte or non-electrolyte chemistry lessens in importance to colloid chemistry. For amphoteric and non-ionic surfactants, this is the concentration of surfactants where micelles, or aggregated surfactant molecules, begin to influence media chemistry.)

As a result of the foregoing, it is seen that an inkjet ink having better directionality and hence better print quality ink would have the seemingly incompatible properties of relatively high surface tension and relatively low contact angle between the ink and the orifice plate material. The surfactant (s) employed in the practice of the present invention provide the ink with the requisite surface tension and contact angle to provide the improved results.

2. Oligomers

In addition to using any of the foregoing surfactants (amine oxides, betaines, sulfo-betaines, and/or polymeric surfactants), another way around this incompatibility (high surface tension and low contact angle) is to use very short length polymers, more properly called oligomers, which tend not to concentrate at the air-ink interface and therefore have high surface tension; yet, because they are highly polar, will interact strongly with the chamber walls which tend to be polar materials like polyimides, urethanes, acrylates, etc. If the oligomers are too long, they will eventually affect the surface tension; consequently, there is a balance to achieve between length and physical properties. Other solvents added to the ink should also have high surface tension such that the surface tension of the ink is at least 35 dyne/cm. Examples of such desirable high surface tension solvents include N-methyl formamide and 2-pyrrolidone.

The concentration of the oligomer in the ink is subject to the same considerations discussed above with regard to critical micelle concentration and the same ranges. However, in practice, the oligomers tend to be somewhat higher in concentration than the surfactants.

Either one or more surfactants, as disclosed herein, or one or more oligomers, as disclosed herein, may be added to the ink to provide the indicated surface tension and contact angle. Preferably, a combination at least one surfactant and at least one oligomer is beneficially employed in the practice of the present invention.

The inks of the present invention comprise (1) about 5 to 50 wt %, preferably about 10 to 25 wt %, water-miscible organic co-solvent, (2) about 0.05 to 10 wt %, preferably about 0.5 to 10 wt %, colorant (pigment or dye), (3) about 0.01 to 10 wt %, preferably about 0.01 to 5 wt %, and most preferably about 0.05 to 2 wt %, surface active additive (one or more surfactant plus one or more oligomer) of the present invention, and (4) water. Other components and additives to the ink may also be present, as discussed below.

The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethyl-ene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

The following pigments are useful as colorants in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, Monarch® 700, Cabojet200, Cabojet300, IJX55, and IJX76. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD 1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black.

Dyes, whether water-soluble or water-insoluble, may be employed as colorants in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Further specific examples of water-soluble dyes (anionic) include Direct Yellow 132, Direct Blue 199, and Magenta 377 (Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

The balance of the ink is water, together with other additives commonly added to inkjet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

INDUSTRIAL APPLICABILITY

The inkjet inks having the surface active additive that provides the ink with a surface tension of at least 35 dyne/cm and a contact angle (with KAPTON orifice plates) of between 35 and 65 degrees are expected to find use in inkjet printing.

What is claimed is:

1. An inkjet ink for printing onto a print medium through an orifice in an orifice plate in a printhead, said inkjet ink evidencing minimal tail breakup and improved drop trajectory, thereby evidencing improved print quality, wherein said minimal tail breakup and improved drop trajectory is achieved by said ink containing at least one surface active additive in an amount sufficient to provide said inkjet ink with a surface tension of at least 35 dyne/cm and a contact angle with said orifice plate having a value within a range of 35 to 65 degrees, wherein said amount of said at least one surface active additive is at or below its critical micelle formation concentration.

2. The inkjet ink of claim 1 wherein said orifice plate comprises an aromatic polyimide.

3. The inkjet ink of claim 1 wherein said at least one surface active additive is selected from the group consisting of surfactants and oligomers.

4. The inkjet ink of claim 3 wherein said surfactants are selected from the group consisting of amine oxides, betaines, sulfo-betaines, and polymeric surfactants.

5. The inkjet ink of claim 1 wherein said amount is about 0.01 to 10 wt %.

6. The inkjet ink of claim 1 wherein said amount is about 0.01 to 10 wt %.

7. The inkjet ink of claim 6 wherein said amount is about 0.05 to 2 wt %.

8. An inkjet ink for printing onto a print medium through an orifice in an orifice plate comprising an aromatic polyimide in a printhead, said inkjet ink evidencing minimal tail breakup and improved drop trajectory, thereby evidencing improved print quality, wherein said minimal tail breakup and improved drop trajectory is achieved by said ink containing at least one surface active additive in an amount of about 0.01 to 10 wt %, sufficient to provide said inkjet ink with a surface tension of at least 35 dyne/cm and a contact angle with said orifice plate of between 35 to 65 degrees, wherein at least one said surface active additive comprises at least one member selected from the group consisting of amine oxides, betaines, sulfo-betaines, and polymeric surfactants, and wherein said surface active additive is present in said ink in an amount that is at or below its critical micelle formation concentration.

9. The inkjet ink of claim 8 wherein said amount is about 0.01 to 5 wt %.

10. The inkjet ink of claim 9 wherein said amount is about 0.05 to 2 wt %.

11. The inkjet ink of claim 8 wherein said amine oxide has the formula

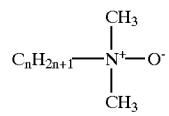

where n is greater than 8 and less than 16.

12. The inkjet ink of claim 11 wherein n=12.

13. The inkjet ink of claim 8 wherein said betaine has the formula $$R_1R_2R_3\text{—}N^+\text{—}CH_2\text{—}COO^-$$

where $R_1$ is a $C_8$ to $C_{22}$ alkyl chain, and $R_2$ and $R_3$ are independently $C_1$ to $C_4$ alkyl chains.

14. The inkjet ink of claim 8 wherein said sulfo-betaine has the formula $$R_1R_2R_3\text{—}N^+\text{—}CH_2\text{—}SO_3^-$$

where $R_1$ is a $C_8$ to $C_{22}$ alkyl chain, and $R_2$ and $R_3$ are independently $C_1$ to $C_4$ alkyl chains.

15. The inkjet ink of claim 8 wherein said polymeric surfactant has the formula

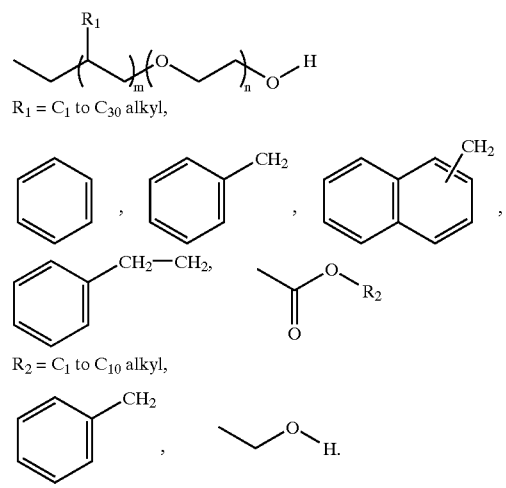

16. A method of reducing tail breakup and improving drop trajectory in an inkjet ink, said method comprising adding at least one surface active additive to said inkjet ink in an amount sufficient to provide said inkjet ink with a surface tension of at least 35 dyne/cm and a contact angle of about 35 to 65 degrees between said inkjet ink and an orifice plate containing a plurality of orifices in a printhead through which said inkjet ink is jetted, wherein said amount of said at least one surface active additive is at or below its critical micelle formation concentration.

17. The method of claim 16 wherein said orifice plate comprises an aromatic polyimide.

18. The method of claim 16 wherein said surface active additive is selected from the group consisting of amine oxides, betaines, sulfo-betaines, and polymeric surfactants.

19. The method of claim 16 wherein said amount is about 0.01 to 10 wt %.

20. The method of claim 19 wherein said amount is about 0.01 to 5 wt %.

21. The method of claim 20 wherein said amount is about 0.05 to 2 wt %.

* * * * *